United States Patent [19]

Csaszar

[11] Patent Number: 5,014,739
[45] Date of Patent: May 14, 1991

[54] CHECK VALVE ASSEMBLY

[75] Inventor: Gabor Csaszar, McHenry, Ill.

[73] Assignee: CED's, Inc., Addison, Ill.

[21] Appl. No.: 418,580

[22] Filed: Oct. 10, 1989

[51] Int. Cl.$^5$ ............................................. F16K 15/14
[52] U.S. Cl. ................................. 137/512.15; 137/854
[58] Field of Search ................. 137/512.15, 515.7, 843, 137/854, 855, 856, 857, 858

[56] References Cited

U.S. PATENT DOCUMENTS

| | | | |
|---|---|---|---|
| 2,525,799 | 10/1950 | Hecker | 137/515.7 |
| 3,871,175 | 3/1975 | Yamamoto | 137/512.3 X |
| 4,084,606 | 4/1978 | Mittleman | 137/854 X |
| 4,222,407 | 9/1980 | Ruschke et al. | 137/512.15 |
| 4,307,731 | 12/1981 | Kaufman | 137/854 X |
| 4,319,452 | 3/1982 | Morita et al. | 137/512.15 X |
| 4,415,003 | 11/1983 | Paradis et al. | 137/843 |
| 4,565,214 | 1/1986 | Parman | 137/512.15 |
| 4,633,853 | 1/1987 | Prill et al. | 137/515.7 X |
| 4,765,372 | 8/1988 | Beecher | 137/843 |

*Primary Examiner*—John Rivell
*Attorney, Agent, or Firm*—Welsh & Katz, Ltd.

[57] ABSTRACT

A check valve assembly is disclosed comprising an upper housing section having an inlet port, a first outer rim portion and a platform section adjacent the outer rim portion, and a lower housing section having an outlet port and a second outer rim portion, the second rim portion extending adjacent the first rim portion and abutting the platform portion when the upper and lower housing sections are melted together, the first rim portion maintaining the melted portions of the upper and lower housing sections within the housing, the upper and lower housing sections being configured to facilitate the melting process. The check valve assembly also comprises a valve seat, which is mounted between a seating ring on the upper housing section and a platform portion on the lower housing section, valve closure support means, and valve closure means for providing for the selective flow of fluid into the housing between the inlet port and the outlet port, the valve closure support means having a central post with tapered sides and a radiused base corresponding to a radiused section and tapered aperture in the valve seat, and a sealing ring to provide for sealing engagement between the valve seat and the valve closure support means.

11 Claims, 2 Drawing Sheets

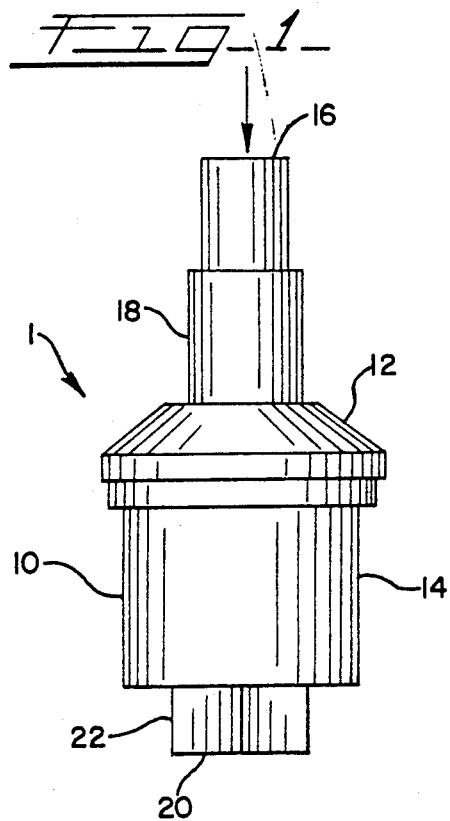
FIG_1_
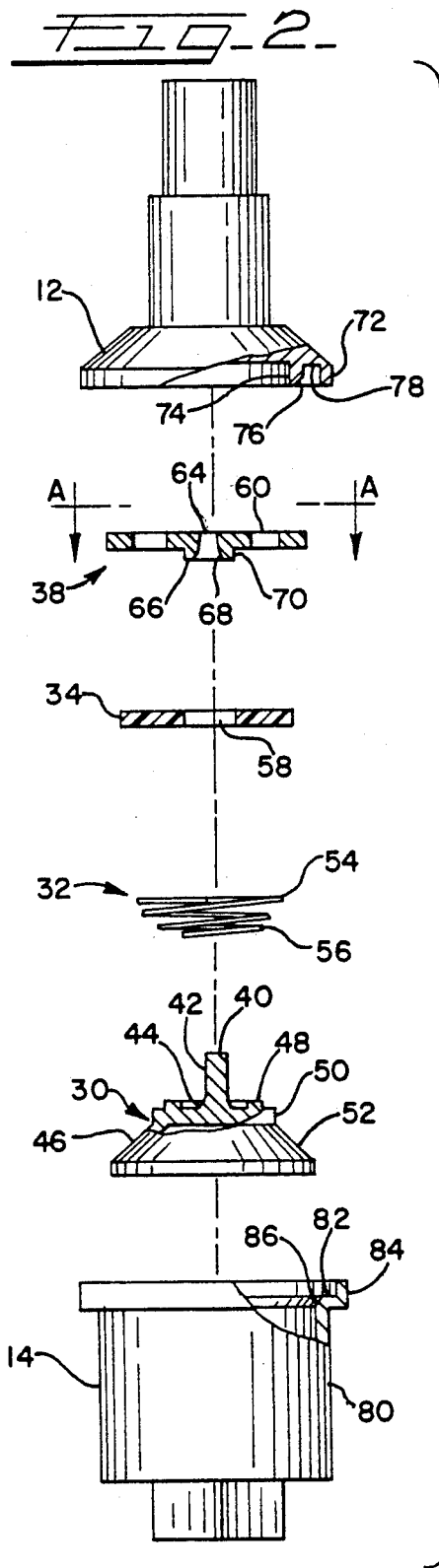
FIG_2_
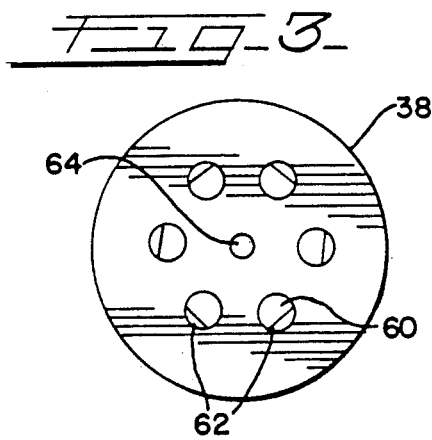
FIG_3_

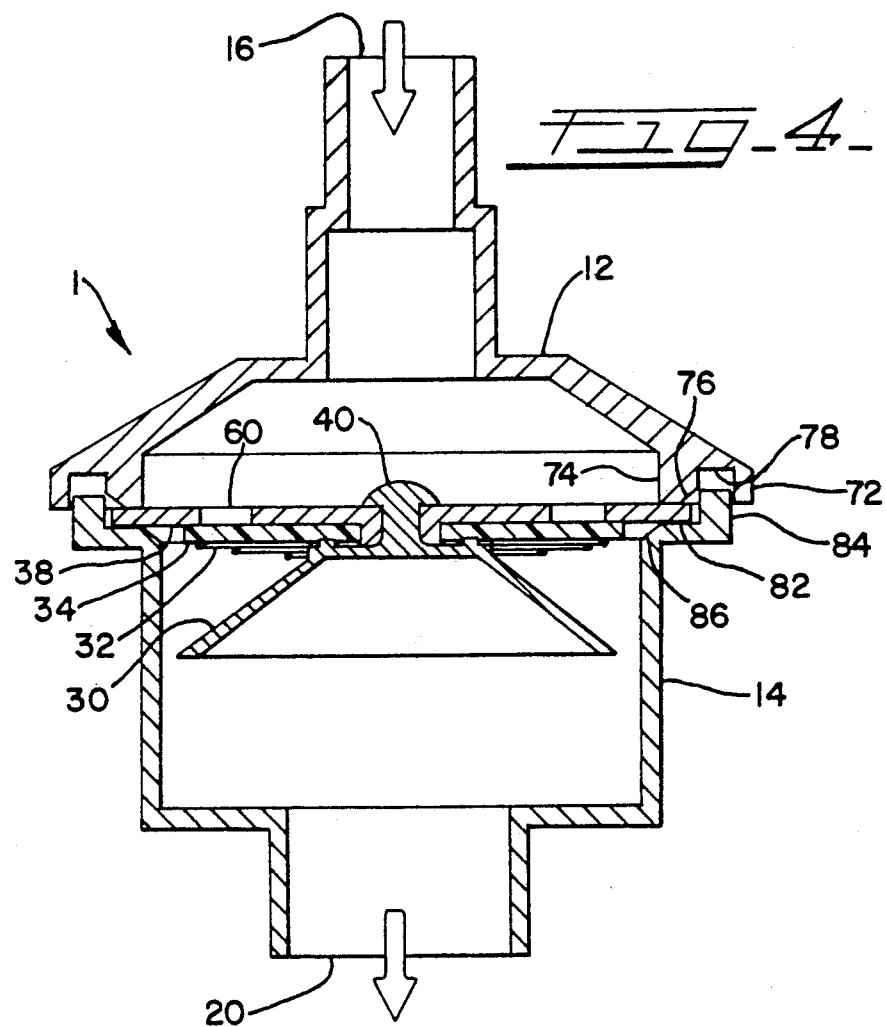
FIG-4-
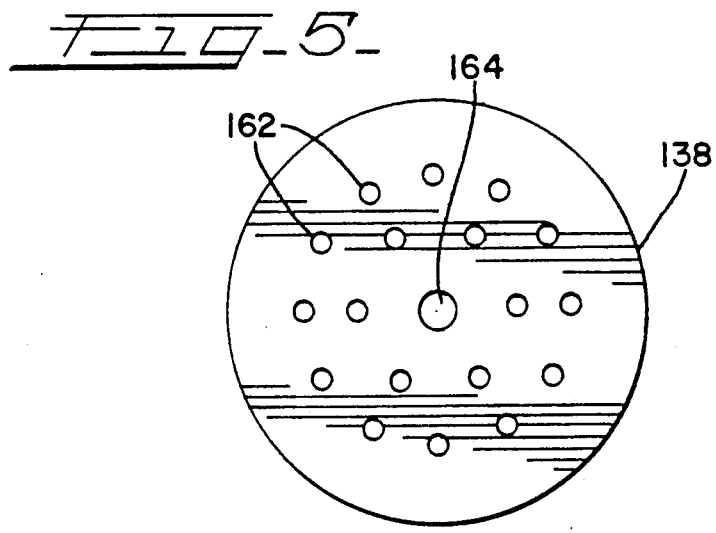
FIG-5-

CHECK VALVE ASSEMBLY

FIELD OF THE INVENTION

This invention relates to check valves. More particularly, the invention relates to check valves for use in automobile exhaust systems. Such check valves are placed in the air supply conduit leading to the exhaust manifold or catalytic converter and are intended to prevent hot, corrosive exhaust gases from flowing back through the air supply conduit and interfering with the operation of the air supply pump.

BACKGROUND OF THE INVENTION

In automobile exhaust systems, it is advantageous to introduce air directly into the exhaust manifold or catalytic converter to assist in oxidizing the unburnt gaseous components contained in the exhaust gas. The air is supplied by an air pump, which is driven by the automobile engine and is therefore operable during the operation of the engine. A check valve is usually provided in the air supply conduit leading from the air pump to the catalytic converter or exhaust manifold to protect the air pump from hot, corrosive exhaust gas which may backflow into the air supply conduit.

The presence of air in the air supply conduit downstream of the check valve and upstream of the exhaust manifold or catalytic converter generally provides an air cushion which prevents the high-temperature exhaust gas from coming into contact with the check valve. Nevertheless, when the air pump is not operating, the air cushion dissipates and exhaust gas may seep into the air supply conduit and come into contact with the check valve. The exhaust gas is of relatively high temperature Therefore, check valves are typically made of heat resistant metals. However, the metal to metal contacts between the parts of these check valves are insufficient to adequately seal the check valve and prevent leakage of air.

Furthermore, as the air cushion between the check valve and the source of exhaust gas diminishes, due to leakage in the check valve, exhaust gas is allowed to come into contact with the metal parts of the check valve. As a result, vaporized water and harmful gaseous components contained in the exhaust gas, such as nitrogen oxide and sulfur, condense on the metal parts, forming such corrosive compounds as sulfuric acid. The effect of the corrosive compounds on the metal check valves greatly reduce their ability to prevent a backflow of exhaust gas from reaching the air pump.

One prior device, described in U.S. Pat. No. 3,871,175, attempts to solve this problem by providing two check valves in the air supply conduit: a metal check valve adjacent the source of high-temperature exhaust gas, and a plastic check valve adjacent the air pump. Such a system is obviously more costly than a single check valve system, and fails to solve the problem of providing a single check valve which is capable of effectively protecting the air pump from a backflow of exhaust gas.

To overcome the problems caused by corrosion in metal check valves, a plastic check valve is sometimes used. Typical plastic valve housings are comparatively weaker than metal housings, though, and tend to fracture along the seams joining the several sections. In addition, although constructed of high temperature plastic, the internal parts of these check valves may still be affected by the heat of the exhaust gas. For example, a valve seat subjected to high temperature may deform, resulting in an incomplete seal between the valve closure element and the valve seat. In addition, the internal parts of existing valves do not sealingly engage to provide a sufficient seal against the backflow of exhaust gases. Furthermore, the orifices of existing valve seats are so large that the elastomeric sealing member often bends into the orifices when exposed to back pressure, thereby resulting in an inadequate seal. As a result, the check valve is unable to prevent a backflow of exhaust gas from reaching the air pump.

SUMMARY OF THE INVENTION

It is therefore an object of the present invention to provide an improved check valve which is both capable of withstanding the high temperatures associated with automotive exhaust gas and resistant to the corrosive effects of the exhaust gas. It is a further object of the present invention to provide a check valve having internal valve elements that sealingly engage to prevent leakage of air during all operating conditions. It is another object of this invention to provide a valve body having two sections that are specifically configured to facilitate the ultrasonic welding of the valve body a into a unitary, rigid structure.

According to the present invention, there is provided an improved check valve having a housing and internal valve elements constructed of a high temperature thermoplastic material capable of withstanding the corrosive affects of the exhaust gas. The check valve housing is manufactured in two pieces which, during assembly, are ultrasonically welded together to form a unitary housing incapable of leaking. Both upper and lower sections of the valve body are configured to facilitate ultrasonic welding of the two parts into the unitary valve body.

The internal valve elements comprise a thermoplastic valve seat and a valve closure support member which are configured so as to sealingly engage upon assembly with a flexible valve closure member and a biasing element. An annular ring formation on the valve closure support member engages the flexible valve member, which resides between the valve closure support member and the valve seat, and squeezes the flexible member against the valve seat to provide a tight seal between these three elements. A post extends from the top of the valve closure support member and into a corresponding aperture in the valve seat to provide a connecting means therebetween. The post is tapered and is provided with a radiused base which engages a corresponding radiused portion of the valve seat aperture to provide for further sealing engagement between the valve support member and the valve seat.

The valve seat is provided with a plurality of valve openings, each having a generally circular shape with the segments of the valve openings closest to the circumference of the valve seat closed-off to provide a larger surface for sealing engagement with the flexible valve member. Another embodiment of the valve seat provides for a larger number of smaller diameter, generally circular valve openings. These reduced-size valve openings prevent bending of the flexible valve member into the openings when the check valve is exposed to back pressure.

These and other objects and advantages of the present invention will be made apparent from the following description with reference to the accompanying drawings.

BRIEF DESCRIPTION OF THE DRAWINGS

FIG. 1 is a perspective view of the check valve according to the present invention;

FIG. 2 is an exploded, partial cross-sectional side view of the check valve;

FIG. 3 is a top view of the valve seat;

FIG. 4 is an enlarged, cross-sectional side view of the assembled check valve prior to being welded; and FIG. 5 is a top view of another embodiment of the valve seat.

DETAILED DESCRIPTION OF THE PREFERRED EMBODIMENTS

Referring to FIG. 1, the check valve 1 comprises a generally circular housing 10 having an upper housing section 12 and a lower housing section 14. An inlet port 16 is provided in a top reduced diameter extendable section 18 of upper housing section 12. An outlet port 20 is provided in a bottom reduced diameter extendable section 22 of lower housing section 14. The top reduced diameter section 18 is attachable to the air supply conduit extending from the air supply pump (not shown), and the bottom reduced diameter section 22 is attachable to a conduit leading to the automobile exhaust manifold or catalytic converter (not shown).

The upper and lower housing sections 12 and 14 of housing 10 are molded or constructed out of a durable, high temperature and corrosion resistant material, such as glass-filled nylon or Torlon ®. In the preferred embodiment, sections 12 and 14 are ultrasonically welded together to provide an air-tight seal in the check valve housing 10.

Referring to FIG. 2, residing within housing 10 are a number of valve elements which together permit air entering the check valve through inlet port 16 to flow through outlet port 20, but prevent air or exhaust gas from flowing in the opposite direction. The valve elements comprise a valve closure support member 30, a conical biasing element 32, a flexible valve closure element 34, and a generally circular valve seat 38.

Referring to FIGS. 2 and 4, valve closure support member 30 comprises a central post 40 having a tapered side portion 42 and an radiused bottom portion 44. Valve closure support member 30 also comprises a base portion 46 having an axially extending annular sealing ring 48 circumscribing post 40, an annular biasing element support member 50 immediately below both post 40 and sealing ring 48, and an outwardly flared body member 52 extending beneath the biasing element support member 50. When the valve elements are assembled, sealing ring 48 compresses flexible valve closure element 34 into valve seat 38 to provide an air-tight seal between valve closure support member 30 and valve seat 38 around post 40. Sealing ring 48 also acts as a support for valve seat 38 by shortening the effective moment arm of valve seat 38, which would otherwise initiate at post 40. Valve support member 30 is constructed of a high temperature thermoplastic material.

Conical biasing element 32 is constructed of stainless steel and comprises a larger diameter portion 54 and a smaller diameter portion 56. When the valve elements are assembled, smaller diameter portion 56 resides around biasing element support 50 of valve closure support member 30 to prevent misalignment of the biasing element 32

Flexible valve closure member 34 is generally disc-shaped and is provided with a central aperture 58 which allows post 40 of valve closure support member 30 to pass through valve closure member 34. When the check valve is assembled, valve closure member 34 is biased against valve seat 38 by means of biasing element 32.

Valve seat 38 is generally disc-shaped and is provided with a plurality of valve apertures comprising valve openings 60. Referring to FIG. 3, valve openings 60 are generally circular, having flat portions 62 on the segments of openings 60 nearest the outer circumference of valve seat 38. These flat portions 62 provide a greater sealing area for engagement with valve closure member 34. Valve seat 38 is also provided with a central tapered aperture 64 for post 40 of valve closure support member 30. Central aperture 64 is circumscribed by a raised annular section 66 having a radiused portion 68 around the outer extent of the inside diameter of central aperture 64. Tapered aperture 64 and radiused portion 68 engage corresponding tapered side portion 42 and radiused bottom portion 44 of post 40 of valve closure support member 30 to provide for sealing engagement between valve seat 38 and valve closure support member 30. Raised annular section 66 is also provided with an annular outer shoulder 70 having approximately the same diameter as central aperture 58 of valve closure member 34. When assembled, central aperture 58 of valve closure member 34 resides around outer shoulder 70 of valve seat 38 to provide for proper alignment of valve closure member 34 with respect to valve seat 38.

Referring still to FIGS. 2 and 4, upper housing section 12 is provided with an axially extending outer annular rim portion 72 and an axially extending inner annular seating ring 74 having an angled portion 76. Upper housing section 12 also has a platform portion 78 at the base of outer rim 72 between outer rim 72 and seating ring 74. The lower housing section 14 comprises a generally cylindrical body portion 80 and is provided with an annular platform portion 82 extending radially outwardly from the top of the cylindrical body portion 80, and an annular rim portion 84 extending axially from the outer circumference of annular platform portion 82. A chamfered section 86 on the annular platform 82 adjacent the top of cylindrical body portion 80 effects the transfer of acoustic energy to the section of annular platform 82 adjacent chamfered section 86 during the ultrasonic welding of upper housing section 12 to lower housing section 14.

Referring to FIG. 4, the valve elements are assembled with the smaller diameter portion 56 of biasing element 32 residing around biasing element support 50 of valve closure support member 30. Flexible valve closure member 34 is aligned with its central aperture 58 around the annular outer shoulder 70 of valve seat 38. Valve closure support member 30 is attached to valve seat 38 by means of post 40 extending through aperture 64 until tapered side 42 and radiused bottom 44 of post 40 engage the corresponding tapered orifice 64 and radiused portion 68 of valve seat 38. Valve closure support member is held in this position by means of the top of post 40 being deformed or mushroomed over aperture 64. In the assembled position, sealing ring 48 of valve closure support member 30 compresses the section of flexible valve closure member 34 adjacent shoulder 70 of valve seat 38 to provide for sealing engagement between valve closure support member 30 and valve seat 38. This sealing engagement and the sealing engagement between post 40 of valve closure support member 30 and aperture 64 of valve seat 38 prevent backflow exhaust gas or air from flowing through aperture 64 around post 40.

As described above, the valve elements comprising the valve closure support member 30, biasing element 32, and valve closure member 34 are suspended from valve seat 38, which is supported in the valve housing 10 by means of the outer circumference of valve seat 38 resting on annular platform portion 82 of lower housing section 14. Valve seat 38 is held in this position by seating ring 74 of upper housing section 12.

An airtight seal between upper housing section 12, valve seat 38, and lower housing section 14 is provided when these elements are attached, by melting, ultrasonic welding, or any other suitable means. To facilitate the ultrasonic welding process, seating ring 74 of upper housing section 12 is provided with an angled portion 76, and annular platform 82 of lower housing section 14 is provided with a chamfered edge 86 at its inner diameter. Angled portion 76 and chamfered edge 86 effect the transfer of sonic energy to a small ring-shaped area of valve seat 38 lying between seating ring 74 and the area of platform 82 immediately adjacent chamfered edge 86. The concentration of sonic energy in this ring-shaped area of valve seat 38 effectively melts seating ring 74 into the ring-shaped area of valve seat 38, which in turn melts into platform 82 of lower housing section 14 to from a solid piece. When seating ring 74 melts, annular rim 84 of lower housing section 14 is allowed to travel into the space between seating ring 74 and rim 72 of upper housing section 12 and combine with platform 78 and seating ring 74 of upper housing section 12 to form a firm, airtight bond between upper housing section 12 and lower housing section 14. Rim 72 of upper housing section 12 prevents the melted material from flowing from between upper and lower housing sections 12 and 14 and therefore eliminates the need to de-burr the housing 10 after the melting or ultrasonic welding process is completed.

Referring to FIG. 5, another embodiment of valve seat 38, designated by reference numeral 138, is provided with a plurality of smaller apertures comprising valve openings 162 and a central aperture 164 corresponding to the configuration of post 40 of valve closure support member 30. The smaller valve openings 162 are designed to prevent flexible valve closure member 34 from bending into the valve openings and therefore causing leakage, which has been known to occur in some checkvalves with back pressures of as low as two to three pounds per square inch. Valve openings 162 have a diameter of approximately twice the thickness of the valve seat. Valve openings of this size have been found to resist leakage caused by bending of the flexible valve closure member for back pressures of up to seventy-five pounds per square inch.

In operation, air entering check valve 1 through inlet port 16 passes through valve openings 60 in valve seat 38 and causes flexible valve closure member 34 to deform downward against the resistance provided by biasing element 32, thereby allowing air to pass through to outlet port 20 in the check valve housing. Air and other gaseous substances flowing in the opposite direction and entering the check valve through outlet port 20 are prevented from passing through valve openings 60 to inlet port 16 by valve closure member 34, which, due to the force from biasing element 32 urging valve closure member 34 against valve seat 38, sealingly engages the valve openings 60 in valve seat 38 and blocks the flow through the valve openings 60.

It should be recognized that, while the invention has been described in relation to preferred embodiments thereof, those skilled in the art may develop a wide variation of structural details without departing from the principles of the invention. Therefore, the appended claims are to be construed to cover all the equivalents falling within the true scope and spirit of the invention.

I claim:

1. A valve assembly comprising:
   a housing having an upper housing section and a lower housing section;
   an inlet port extending through said upper housing section;
   an outlet port extending through said lower housing section;
   said upper housing section including a first axially downwardly extending outer rim portion and a platform portion inwardly adjacent the base of said first outer rim portion;
   an axially downwardly extending inner annular seating ring inwardly adjacent said platform portion of said upper housing section and spaced from said first outer rim portion, said seating ring including a chamfered portion at the end of said seating ring and spaced from said platform portion to enhance the transfer of acoustic energy for sonic welding;
   a disk-like valve seat having an annular outer portion against the end of said seating ring and spaced below said chamfered portion;
   said lower housing section including a second axially upwardly extending outer rim portion of less diameter than said first outer rim portion;
   said second outer rim portion extending upwardly between said first outer rim portion and said seating ring to about said platform portion when said upper and lower housing sections are joined to secure said valve seat against the end of said seating ring and form said housing, and to thereby form an annular space between the side of said second outer rim portion and said chamfered portion at the outside annular portion of said valve seat, with said annular space being located away from said platform portion and adjacent said valve seat annular outer portion;
   said annular outer portion of said valve seat and the end portion of said seating ring being joined by melting and fusing together; and,
   said second outer rim portion and said platform portion being joined by melting and fusing the second outer rim portion and the platform portion together, with the first outer rim portion of said upper housing section maintaining melted portions of said second outer rim portion and said platform portion within said upper housing section to prevent external formation of fusion burrs.

2. The valve assembly of claim 1 wherein said melting is performed by sonic welding applied to said second outer rim portion and said platform portion.

3. The valve assembly of claim 1 wherein:
   said first outer rim portion and said platform portion extended annularly around the bottom end of said upper housing section;
   said second outer rim portion extends annularly around the top end of said lower housing section, said second outer rim portion having a smaller diameter than said first outer rim portion; and, said second outer rim portion extends inside said first outer rim portion to prevent melted portions or said platform portion and said second outer rim portion from flowing beyond said first outer rim portion when said upper and lower housing sections are sonically welded together.

4. The valve assembly of claim 1 wherein:
said lower housing section includes a chamfered portion proximate said second outer rim portion to enhance the transfer of acoustic energy for sonic welding.

5. The valve assembly of claim 4 wherein said lower housing section contains a second platform portion between said second outer rim portion and said chamfered portion of the lower housing section for securing said annular outer portion of said valve seat against the end of said seating ring.

6. A valve assembly comprising:
a housing having an upper housing section and a lower housing section joined together to form said housing;
an inlet port extending through said upper housing section;
an outlet port extending through said lower housing section;
valve seat means mounted in said housing and having means therein provided for the selective flow of fluid in said housing between said inlet port and said outlet port;
valve closure support means affixed to said valve seat means;
said valve closure support means including a base element and a post extending axially from said base element;
said post extending through an aperture in said valve seat means;
valve closure means mounted to said valve closure support means between said valve closure support means and said valve seat means; and,
said aperture in said valve seat means including a radiused portion which contacts and forms a sealing engagement with a correspondingly radiused portion of said post, thereby providing a seal between said valve seat means and said valve closure support means.

7. The valve assembly of claim 8 wherein said valve seat includes a raised section surrounding said aperture, said radiused portion of said aperture being formed in said raised section.

8. A valve assembly comprising:
a housing having an upper housing section and a lower housing section joined together to form said housing;
an inlet port extending through said upper housing section;
an outlet port extending through said lower housing section;
valve seat means mounted in said housing and having means therein providing for the selective flow of fluid in said housing between said inlet port and said outlet port;
valve closure support means affixed to said valve seat means;
valve closure means mounted to said valve closure support means between said valve closure support means and said valve seat means;
said valve closure means including a flexible valve member biased into engagement with said valve seat means;
said valve closure support means including an axially extending sealing ring adapted to abut said flexible valve member, assist in biasing said flexible valve member against said valve seat means, and form a seal between said valve closure support means and said flexible valve member.

9. The valve assembly of claim 8 which includes biasing means extending between said valve closure support means and said flexible valve member to bias said flexible valve member into engagement with said valve seat means.

10. The valve assembly of claim 9 wherein said biasing means is a conical spring.

11. A valve assembly comprising:
a housing having an upper housing section and a lower housing section joined together to form said housing;
an inlet port extending through said upper housing section;
an outlet port extending through said lower housing section;
valve seat means mounted in said housing and having apertures therein to provide for the selective flow of fluid through said housing;
valve closure means to close said apertures when said fluid is flowing from said outlet port to said inlet port, and to open said apertures when said fluid is flowing from said inlet port to said outlet port;
each of said apertures being substantially circular in configuration and having a flattened circumferential portion forming the portion of said aperture adjacent the outer extent of said valve seat means.

* * * * *

UNITED STATES PATENT AND TRADEMARK OFFICE
CERTIFICATE OF CORRECTION

PATENT NO. : 5,014,739
DATED : May 14, 1991
INVENTOR(S) : Gabor Csaszar

It is certified that error appears in the above-identified patent and that said Letters Patent is hereby corrected as shown below:

In Column 1, Line 35, after "temperature" insert a period.

In Column 1, Line 49, "reduce" should be --reduces--.

In Column 6, Line 37, "about" should be --abut--.

In Column 7, Line 2, "or" should be --of--.

In Column 7, Line 28, "provided" should be --providing--.

In Column 7, Line 46, (line 1 of claim 7) "claim 8" should be --claim 6--.

Signed and Sealed this

Twenty-seventh Day of October, 1992

Attest:

DOUGLAS B. COMER

*Attesting Officer*     *Acting Commissioner of Patents and Trademarks*